United States Patent [19]
Bierleutgeb et al.

[11] Patent Number: 4,586,794
[45] Date of Patent: May 6, 1986

[54] MICROSCOPE WITH AN OBJECTIVE TURRET

[75] Inventors: Fritz Bierleutgeb; Gerhard Kappl, both of Vienna, Austria

[73] Assignee: C. Reichert Optische Werke, AG, Vienna, Austria

[21] Appl. No.: 649,094

[22] Filed: Sep. 10, 1984

[30] Foreign Application Priority Data

Sep. 10, 1983 [DE] Fed. Rep. of Germany ....... 3332788

[51] Int. Cl.[4] .............................................. G02B 7/16
[52] U.S. Cl. .................................................. 350/520
[58] Field of Search ................. 350/247, 507, 520, 559

[56] References Cited

U.S. PATENT DOCUMENTS 2,977,848  4/1961  Malfeld ............................... 350/520

FOREIGN PATENT DOCUMENTS 1147455  4/1969  United Kingdom ................. 350/520

Primary Examiner—William H. Pinter
Attorney, Agent, or Firm—Alan H. Spencer; Stephen Raines; Gary M. Nath

[57] ABSTRACT

In a microscope with a motor-driven objective turret, an intermediate position is provided between each two adjacent primary turret positions. This intermediate position enables manual operations to be carried out on the objectives in the objective turret, in a convenient manner, before viewing. Automatic means are provided for switching off the motor in both the primary and the intermediate turret positions.

8 Claims, 1 Drawing Figure

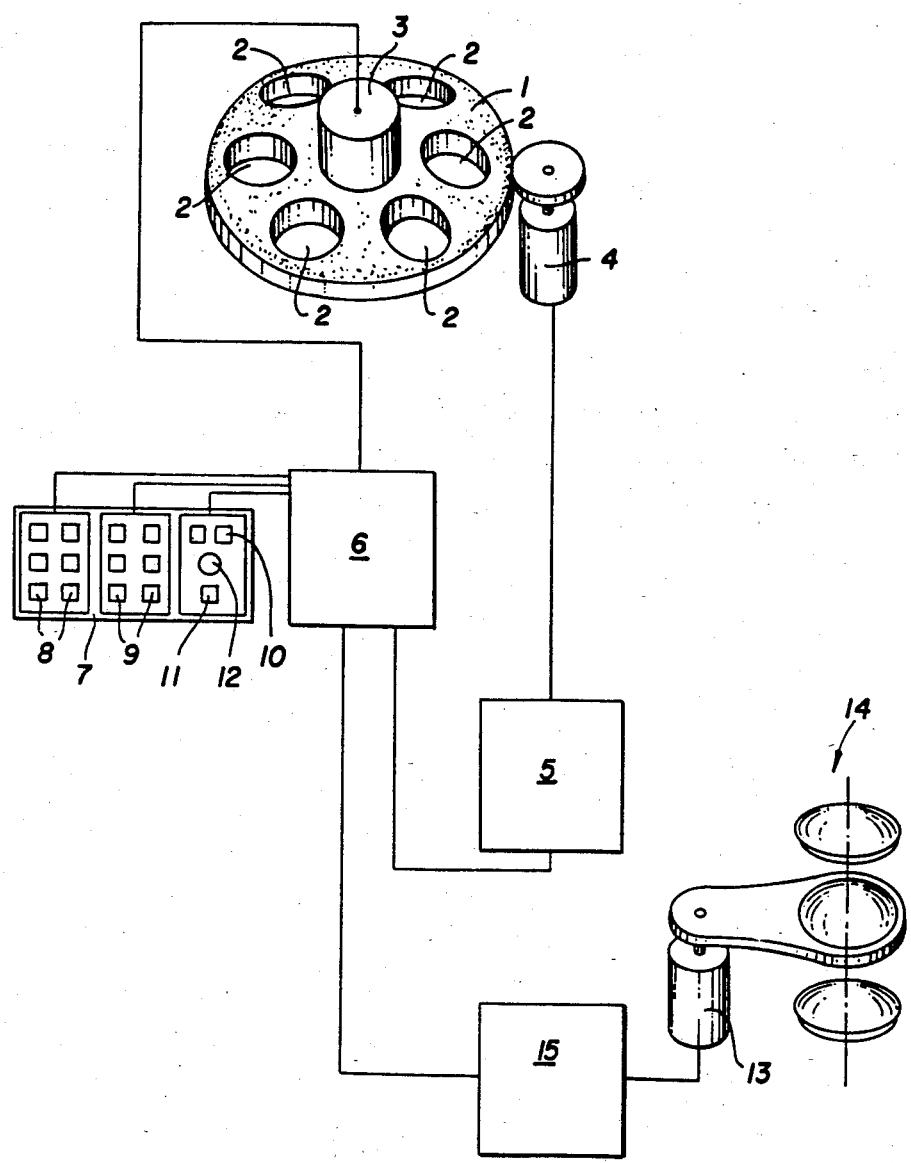

MICROSCOPE WITH AN OBJECTIVE TURRET

BACKGROUND OF THE INVENTION

This invention relates to a microscope with an objective turret carrying a large number of objective lenses, in which a turret position located in the optical path of the microscope is assigned to each objective. A motor is connected to the objective turret so that it can drive the turret, and it can be switched off, automatically, in the individual turret positions.

Microscopes of this type are known which have an objective turret that can be rotated in either direction by means of a motor, that is to say which is reversible. A motor-driven turret is used to avoid contaminating the object to be examined, or even destroying it, which can occur in cases involving manual turret-rotation. Contamination can have extremely disadvantageous results, particularly when examining thin-film semiconductor structures which fall within the micron range.

In these known microscopes, the motor which drives the objective turret is connected to a double control key. This causes the objective turret to rotate in one direction when one of the keys is operated, and drives it in the other direction, forwards or backwards, when the other key is operated. When a double key is used in this way, the objective turret rotated for as long as this double key remains pressed. When this key, which is known as a plus/minus key, is released, the objective turret comes to rest in the next objective position.

When low-power objectives which exhibit a large depth of focus are being used, the insensitivity of the visual focussing adjustment can lead to the destruction of the object being examined. This can happen during the change-over, that is to say during rotation from a low-power objective of the above-mentioned type to a very high-power objective. When working with an unfamiliar microscope, it is not always possible to reliably prevent a collision between a high-power objective that has a short working distance and the object, even when the objectives are precisely adjusted on the objective turret so that they are "parfocal."

It can also happen that dry-type objectives having short working distances dip into immersion oil and thereby become contaminated. Moreover, in the case of known microscopes, it is necessary to lower the object stage when applying or cleaning off immersion oil and, in particular, when changing objects.

As a result, safe operation of a microscope of this type is possible only at considerably cost.

OBJECT OF THE INVENTION

The object underlying the present invention is accordingly to design a microscope, of the foregoing type, which is convenient and safe to operate.

BRIEF SUMMARY OF THE INVENTION

This object is achieved, according to the invention, by providing an intermediate position between each two adjacent primary turret positions. Primary turret position, as used herein, refers to a turret position that locates one of the objectives on the microscope optical axis. In these intermediate positions the objectives corresponding to the adjacent primary turret positions are located outside the optical path of the microscope, and the motor can again be switched off by automatic means.

The turret can be halted in the intermediate position on either side of the preselected objective depending on the direction of the turret rotation. This gives the advantage that it is no longer necessary to lower the object stage either when applying immersion oil to an objective; when cleaning it from an objective, or when exchanging objectives. One operation is accordingly dispensed with, so that working with the microscope of the invention becomes both easier and more convenient.

At the same time, the motor can be equipped with a plus/minus control switch having a plus key and minus key, whereby the motor is run forwardly when the plus key is operated, and in reverse when the minus key is operated.

In a preferred embodiment of the invention, an electronic preselector unit is provided for preselecting the intermediate positions of the objective turret. This preselector unit is provided with a plurality of selector keys corresponding to the number of possible intermediate positions of the objective turret. By this means, it is possible, by briefly pressing a key, to preselect and set any desired intermediate position of the objective turret.

At the same time, a control logic unit can be connected to a position transducer installed on the objective turret and programmed so that when two objectives which are located side-by-side on the objective turret are sequentially selected, the intermediate position between these two adjacent objectives is dispensed with if there is no need to apply or remove the immersion oil, or cleaning between two immersions in the liquid. The electronic preselector unit has a number of selector keys corresponding to the number of possible intermediate positions on the objective turret. This provides the further advantage of preventing operating errors, and incidents involving damage, once the selector keys have been set. Moreover, these keys need to be pressed only briefly, and lightly, thus resulting in easy and convenient microscope operation.

In the microscope according to the invention it is also possible, advantageously, to provide reliable protection for a microhardness tester which is mounted on the objective turret. It is essential, when switching on this tester, to ensure that the penetrator, which may take the form of a diamond pyramid, has been retracted.

In a further development of the invention, an indicator means is provided to indicate the intermediate position to which the objective turret is set at any given moment. This indicator means may be one which emits a visible and/or acoustic signal, and prompts the microscopist to carry out a particular action—for example, to immerse an objective—which would not be possible in the working position. This device also make it comparatively more convenient to operate the microscope.

In a further embodiment of the invention, a restart key provides a prompt signal to shift the objective turret from an intermediate position into an adjacent primary turret position. By operating this restart key, it is a simple matter to rotate the objective turret into the objective position which had originally been selected, following the above-mentioned action, for example the application of immersing liquid; the intermediate stop signal is cancelled when the restart key is operated.

In a preferred further development of the invention, the electronic preselector unit is provided with a separate selector key for each primary turret position, instead of a plus/minus key which is know per se. At the same time, the selector keys can carry markings which indicate the magnifications of the respective objectives.

By the operation of one of these selector keys, the objective turret is automatically shifted to the associated primary turret position. This shift movement is automatically controllable by means of a control element in the form of a position transducer which is connected to the objective turret. Exemplary of suitable control elements are a rotation-angle transmitter of a kind that is known per se; an electrical potentiometer, such as is also used, for example, in the arrangement disclosed in German Offenlegungsschrift No. 2,219,521 for automatically implementing the Kohler illumination principle on microscopes; or an optical sensor.

The above arrangement enables each objective to be freely and simply selectable by briefly operating the appropriate selector key, this capability being particularly advantageous when skipping past several objectives. A further advantage resides in trouble-free changing between a low-magnification viewing objective and a high-magnification measuring objective. It is also possible, of course, for a plus/minus key to be present, in addition to the electronic preselector device with an individual selector key for each turret position, thus plus/minus key enabling the objective turret to be indexed to successive positions without the microscopist having to take his eyes away from the microscope eyepieces.

In a further embodiment of the invention, each selector key possesses illumination means, which identifies the objective which is currently located in the optical path of the microscope. A continuous indication as to which objective is being used is hence provided. The magnifications of the objectives corresponding to the respective selector keys can be affixed thereto, so that on briefly pressing a selector key, that key lights up to indicate which objective has been selected. By this means, the user-friendliness of the microscope according to the invention is relatively fundamentally enhanced. In the same way, each selector key can possess illumination means for the selectable intermediate positions between adjacent primary turret positions, so that both the selected primary turret position and a selected intermediate positions are clearly visible, this ensuring, overall, excellent clarity and user-friendliness.

The electronic circuit can also include an adjunct for separately indicating the magnification of the objective located in the working position, or it can display the total magnification if the magnification changer in the microscope eyepiece is incorporated in the motorized drive system.

In a further embodiment of the invention, a movable condenser system is provided, having at least two condenser lenses, each one of which is allocated for use with some only of the objective lenses in the objective turret, and each of the objective lenses having one of the condenser lenses allocated thereto, the movable condenser system being coupled to the objective turret whereby that condenser lens of the condenser system that is allocated to that objective lens in the objective turret that is currently located in the optical path of the microscope is itself located in the optical path of the microscope. This has the advantage of excluding the possibility of operating errors. For example, for low-power objectives, that is to say for objectives with a large object field, one or more lenses in the condenser system are interposed, or swung out, in order to obtain the necessary widefield illumination. This change-over can, according to the invention, be effected automatically, by coupling it to the position of the objective turret. At the same time, the design of the coupling can be such that the condenser arrangement which is allocated to the objective in use at any given moment is automatically moved into the optical path of the microscope, even if the objective turret is operated manually.

It is possible to provide an additional selector-key pad in the electronic preselector unit to permit the preselection of one or several auxiliary lenses to be interposed or withdrawn with particular turret-holes, i.e., with particular objective lenses.

Furthermore, the drive for field stops and/or aperture stops which lie in the optical path of the illuminating system of the microscope can be coupled to the motor which drives the objective turret. By this means, it is even possible to automatically readjust aperture stops and/or field stops when an objective is changed, to that optimum optical conditions prevail at all times in each objective position, and can be simply and conveniently preselected or adjusted.

BRIEF DESCRIPTION OF THE DRAWING

Further details, feature and advantages will be apparent from the following description of an exemplary objective turret which is diagrammatically illustrated in the drawing. The electronic control circuit of his objective turret is illustrated as a block diagram.

DETAILED DESCRIPTION

An objective turret 1, provided with a number of objective openings 2 and a position transducer 3, is mechanically connected to a motor 4 which is capable of shifting the objective turret 1 automatically between the individual primary turret positions and into the intermediate positions between two adjacent primary turret positions. The motor for driving the objective turret is connected, via a starter unit 5, to a control logic module 6, which is also interconnected with the position transducer.

The position transducer 3 can be a rotation-angle transmitter, which is known per se, an electrical potentiometer, an optical sensor, or a similar device for converting the instantaneous position of the objective turret 1 into an electrical signal. This signal may be analog or digital, and is fed into the control logic module 6, where it is compared with a signal which is input from an electronic preselector unit 7. If the signal coming from the position transducer deviates from the signal coming from the electronic preselector unit, which will usually be the case, the control logic module 6 then acts on the starter unit 5 to cause it to drive the motor 4 to which it is connected, and hence the objective turret 1, until the signals from the position transducer 3 and from the electronic preselector unit 7 correspond with one another, that is to say until the objective turret 1 assumes the preselected position. This preselected position can be either a primary position, in which an objective is located in the optical path of the microscope, or an intermediate position.

In a preferred embodiment of the invention, the electronic preselector unit 7 is provided with a number of selector keys 8 which corresponds to the number of possible intermediate positions of the objective turret, and a number of selector keys 9 which corresponds to the number of possible primary turret positions in which the respective objective lenses are located in the optical path of the microscope.

In the illustrated embodiment six objective openings 2 are shown, to which there correspond six selector keys 8 for the intermediate positions and six selector keys 9 for the objective positions. In addition, the electronic preselector unit 7 is provided with a plus/ minus key 10 and restart key 11.

Before and/or after particular primary turret positions, which are preselected by means of one of the selector keys 9, the objective turret 1 automatically remains stationery in an intermediate position between two objectives. It is possible for a signal to be given at the same time by means of a lamp 12, which prompts the microscopist to perform a particular action, for example to apply immersion liquid to an objective. By operation of the restart key 11, after this action has been performed, the light signal emitted by the lamp 12 is cancelled, and a signal supplied by the control logic module 6 to the motor 4, via the starter unit 5, causes the objective turret 1 to be shifted into the position which had originally been preselected by means of the chosen selector key 9.

In order to obtain the necessary widefield illumination, for example when low-power objectives are being employed, it is possible to use a motor 13 to switch over the condenser 14 automatically according to the position of the objective turret 1. To effect this automatic changeover, the signal coming from the position transducer 3 is processed in the control logic module 6, and a command signal is sent to motor-starter unit 15 to the effect that the motor 13 should rotate until the condenser 14 corresponding to the objective which is located in the optical path of the microscope is itself moved into the optical path.

In summary, a microscope which is equipped with an objective turret 1 according to the invention and, if appropriate, a corresponding condenser 14, is accordingly made simple to operate, while ensuring that optimum optical conditions prevail in the microscope at all times.

We claim:

1. A microscope turret drive comprising, a rotatable objective turret, said turret being adapted to carry a plurality of microscope objectives, said turret having a plurality of primary positions and a plurality of alternate positions, each of said plurality of primary positions being adapted to locate a respective microscope objective on the microscope optical path, each of said plurality of alternate positions being adapted to locate two adjacent objectives on opposite sides of the microscope optical path, drive means for rotating said turret and control means for activating said drive means and stopping said drive means in one of said plurality of primary or alternative positions.

2. A turret drive according to claim 1, wherein said control means includes a plus key and a minus key, whereby the drive means runs forwardly when the plus key is operated, and in reverse when the minus key is operated.

3. A microscope turret drive according to claim 1, wherein said control means includes an electronic preselector unit for preselecting alternative positions of the turret, a plurality of selector keys, each of said plurality of selector keys corresponding to one alternate position of the objective turret.

4. A microscope turret drive according to claim 1, further including indicator means for identifying the alternate position based on the microscope optical path.

5. A microscope turret drive according to claim 4, wherein said control means is a restart key to signal said drive means to rotate said turret from an alternate position to a primary position.

6. A microscope turret drive according to claim 1, wherein said control means is an electronic unit for preselecting the primary positions of the turret, a plurality of selector keys, each of said plurality of selector keys corresponding to one primary position.

7. A microscope turret drive according to claim 6, wherein each selector key is provided with illumination means adapted to indicate which objective is located on the microscope optical path.

8. A microscope turret drive according to claim 1, further including at least two condenser lenses, each of said condenser lenses being allocated for use with only some of the objectives in the objective turret and each objective having one of said condenser lenses allocated thereto, a position sensor coupled to said turret, said sensor generating a signal indicative of the objective positioned on the microscope optical path, condensor drive means for moving said condenser lenses, and said condenser drive means being coupled to said sensor whereby the condenser lens that is allocated to an objective located on the microscope optical path is moved onto the microscope optical path.

* * * * *